United States Patent [19]

Cioca

[11] Patent Number: 4,489,100

[45] Date of Patent: Dec. 18, 1984

[54] METHOD OF FINING ALCOHOLIC BEVERAGES

[75] Inventor: Gheorghe Cioca, Belleville, N.J.

[73] Assignee: Seton Company, Newark, N.J.

[21] Appl. No.: 434,463

[22] Filed: Oct. 14, 1982

Related U.S. Application Data

[63] Continuation of Ser. No. 184,536, Sep. 5, 1980, abandoned.

[51] Int. Cl.³ ............................ C12C 9/08; C12H 1/02
[52] U.S. Cl. .................................... 426/422; 210/730; 426/11
[58] Field of Search ..................... 426/422, 330.4, 490, 426/495, 11, 16; 210/730, 778, 725, 728, 638, 691

[56] References Cited

FOREIGN PATENT DOCUMENTS 3661 of 1869 United Kingdom ................ 426/422

OTHER PUBLICATIONS

Ward et al., The Science and Technology of Gelatin, Academic Press, N.Y. 1977 (pp. 405-412).

*Primary Examiner*—George Yeung
*Attorney, Agent, or Firm*—Webb, Burden, Robinson & Webb

[57] ABSTRACT

A method of fining and clarifying alcoholic beverages is disclosed. The method includes admixing particulate native collagen with an alcoholic beverage subsequent to fermentation. The admixture is aged for a sufficient time to allow the collagen to complex haze causing material in the beverage, and the collagen complexed with the haze causing material is separated by filtration or the like to produce a clear alcoholic beverage.

11 Claims, No Drawings

METHOD OF FINING ALCOHOLIC BEVERAGES

This application is a continuation of application Ser. No. 184,536, filed Sept. 5, 1980, now abandoned.

BACKGROUND OF THE INVENTION

1. Field of the Invention

This invention relates to a process for fining alcoholic beverages and more particularly to a process for fining alcoholic beverages using collagen.

2. Description of the Prior Art

Non-distilled alcoholic beverages whether from grapes, apples, pears, malt, hops, and other fermentable material are hazy after primary fermentation. This haze is caused by small particles 1.0 micron to 0.001 micron in diameter. These haze causing materials are typically grape or yeast proteins, peptides, pectins, gums, dextrans, unstable grape pigments, tannins, hop resins, polyphenols and the like. In order to obtain a brilliant, palatable, clear alcoholic beverage, it is necessary to remove these haze causing materials by a process known in the art as "fining."

Government regulations in the United States and other countries require that fining agents for wine do not change the basic character of the wine; and, in the case of undistilled alcoholic beverages, in many countries, it is required that none of the fining agent remains in the alcoholic beverage.

Typically, the fining is accomplished by complexing the haze causing materials with a particular fining agent and subsequently filtering the complex. Typical fining agents are bentonite, carbon, gelatin, casein and poly(vinylpyrrolidone) and particularly in the case of beer, isinglass is particularly preferred. "Complexing" as used herein means and refers to actual chemical combination and/or physical association. In typical fining processes, the fining agent is combined with the primarily fermented alcoholic beverage and the combination is allowed to age until clarification is accomplished. This aging is conducted for many days and in the case of beer is approximately five days. After the aging is complete and the haze causing materials are sufficiently complexed with the fining agent, the primarily fermented alcoholic beverage is filtered to remove the complexed material. The complexes of the fining agent and the haze causing materials are generally of very fine particle size which tend to cause clogging of the filters and a requirement that the filtration media be changed frequently.

One of the most acceptable fining agents for wine and beer is isinglass, however, isinglass is an expensive commodity. Isinglass, a relatively pure form of collagen, is derived from the tunic of the swim bladder of large fish, for example, Beluga Sturgeon and similar species. Because of the expense and lack of availability of isinglass it has been desired to use a fining agent which is an effective substitute therefore, and preferably improves the fining process by rapid complexization of the haze causing materials and ease of removal of the complex of haze causing material.

In accordance with the present invention a fining agent for alcoholic beverages is provided which is readily available and efficiently complexes with the haze causing materials of fermented alcoholic beverages.

Further in accordance with the present invention, a fining agent for alcoholic beverages is provided wherein the fining agent haze causing complex is easily removed by filtration due to the large size of the material to be filtered. Still further in accordance with the present invention, a fining agent for alcoholic beverages is provided which is insoluble in the alcoholic beverage and is readily completely removed from the alcoholic beverage upon filtration.

BRIEF DESCRIPTION OF THE INVENTION

A method of clarifying alcoholic beverages is provided. The method includes admixing particulate native collagen with an alcoholic beverage subsequent to primary fermentation. The admixture is aged for a sufficient time to allow the collagen to complex haze causing material in the beverage, and the collagen complexed with the haze causing material is separated by filtration or the like to produce a clear alcoholic beverage.

DETAILED DESCRIPTION OF THE INVENTION

"Native collagen" as used herein means and refers to substantially pure collagen free of fat which is derived from the corium which is the intermediate layer of a bovine hide between the grain and flesh sides. Preferably, the native collagen useful in the practice of the invention is from older animals to provide a substantial amount of intramolecular and intrafibular crosslinking. Further, native collagen exists in a triple chain helix along with constant periodicity between triple chains. The triple chain helical configuration of native collagen is sometimes referred to as a fibril and the fibrils align with an axial periodicity of about 640° Å.

Typically, the native collagen prepared in accordance with the present invention is derived from a bovine hide which has been dehaired by liming, degreased to produce substantially pure native insoluble collagen fibers and granulated to the desired particle size. The degreasing and granulation can be accomplished with materials and apparatus known to those skilled in the art. It is important that the final native collagen fiber used in the fining process of the invention retain its cross-linkages, i.e. insolubility in water during processing, but yet remain substantially pure so as not to contaminate or alter the characteristics of the alcoholic beverage being fined.

The native collagen in particulate form, preferably has a particle size of less than 1 millimeter and preferably less than 0.5 millimeter. Most preferably, the native collagen has a particle size of less than 0.05 millimeters. The particle size of the native collagen is important insofar as the finer the particle size, the more surface area to provide complexization of the haze causing material and hence, the finer the particle size, the less native collagen required in the fining process.

The particulate native collagen useful in the practice of the invention may be added as a powder at a level of at least about 0.001 parts by weight to 100 parts by volume of alcoholic beverage and more preferably at least about 0.005 parts by weight to 100 parts by volume of alcoholic beverage. There is no maximum amount of a particulate native collagen which can be added to the alcoholic beverage; however, it is preferred that no more than 0.01 parts by weight to 100 parts by volume of alcoholic beverage be used since above this level the particulate native collagen is in large excess and the unneeded native collagen merely complicates the filtration process.

Although the native collagen may be added as a fine powder directly to the primarily fermented alcoholic beverage, it is preferred to disperse the native collagen in water prior to addition to the alcoholic beverage for ready admixture therewith. Up to 5 percent by weight of collagen in an aqueous suspension may be used. Typically, a one percent or less by weight dispersion of particulate native collagen in water is used.

After the particulate native collagen is added to the alcoholic beverage, the admixture is allowed to age. It has been found in the case of beer that after about four hours the particulate native collagen complexes substantially all of the haze causing material and the complex settles to the bottom of the mixing vessel. This is a distinct advantage over other fining materials which require substantially longer time and in many cases days to completely complex the haze causing materials. The particulate native collagen in most instances fines alcoholic beverages in less than 24 hours.

Subsequent to aging and complexization of the haze causing material with the native collagen, the complex is separated from the alcoholic beverage preferably by filtration. It has been found in accordance with the present invention that the complex is readily filtered and does not tend to clog the filter media thus providing longer life to the filter media and providing for more rapid filtration.

It has been found that the particulate native collagen used as a fining agent is substantially completely removed from the alcoholic beverage upon filtration thus complying with government regulations relating to the fining of such beverages.

The invention will be more fully illustrated with reference to the following examples.

EXAMPLE I

Two hundred pounds of lime split bovine fresh hide were processed in a wooden drum containing 600 pounds of water at 20° C. and 6 pounds of 37% hydrochloric acid. After charging the splits, the water and the acid, the drum was rotated for 4 hours. This initial process was conducted in order to remove residual lime from the collagen. After deliming, the splits were washed with water for 3 hours in the wooden drum at a float of 300% and the water was changed after each hour. The washed splits were then treated with a degreasing agent, and in this example, of 3% solution of a non-ionic surfactant sold under the trade name Triton X 114. The washing of the splits were done at a float of 200% for 5 hours at room temperature in a wooden drum. The degreased splits were washed with water for 4 hours at room temperature at a float of 300%, changing water after each hour. The splits were dried by toggling in extended form so that excess grease was removed. The toggling was conducted for 16 hours at 140° F. After drying, the collagen was in relatively pure form and was immersed in an organic solvent, and in this example, petroleum ether at a float of 300% for 2 hours. The splits were dried and cut into square pieces of 15×15 inches. The pieces were pulverized to a particle size of 0.032 to 0.4 millimeters and the powder was extracted with petroleum ether and again dried. The insoluble native collagen powder at this stage was suitable for fining alcoholic beverages.

EXAMPLE II

The particulate native collagen prepared in accordance with Example I was dispersed in water at a concentration of 0.5% by weight. One part by weight of the 0.5% native collagen solution was added to 100 parts by weight of fermented beer and homogeneously mixed therewith.

Afer 4 hours, the native collagen complexed substantially all of the haze causing materials in the beer and the complexes settled to the bottom of the holding vessel. The supernatant beer was brilliant and clear. The beer was filtered and sufficient to be bottled, canned or similarly packaged.

EXAMPLE III

Example I was repeated except that before deliming, the lime splits were treated for 24 hours at room temperature in the wooden drum with a float 300% solution comprised of 10% sodium hydroxide and 13% sodium sulfate. The particulate native collagen prepared in accordance with Example III was used in fining beer in accordance with Example II with the same results.

EXAMPLE IV

Example III was repeated but after neutralization with hydrochloric acid, the splits were treated for 4 hours at 300% float at room temperature with a solution of 3% citric acid. The process produces highly separated native collagen fibers. The particulate native collagen prepared in accordance with this Example IV was used in accordance with Example II with the same results.

EXAMPLE V

Example I was repeated but after neutralization with hydrochloric acid, the splits were treated with a 300% float at room temperature with a solution of 3% citric acid to provide a native tropocollagen similar to Example III. The particulate native collagen prepared in accordance with this Example V was used in accordance with the procedure of Example II with the same results.

As is illustrated by the Examples, the particulate native collagen fiber is typically prepared from the hides of older animals since the degree of crosslinking is high in relation to calf or the like and the collagen produced therefrom achieves the desired insolubility for rapid complexization of haze causing materials and rapid filtration. Further, the particulate native collagen can be produced in accordance with a number of processes so long as they provide the collagen which is in fibrous crosslinked form and is substantially pure by way of its freedom from fats and oils.

Although the invention has been described with respect to specific materials and specific processes, the invention is only to be limited in so far as is set forth in the accompanying claims.

I claim:

1. A method of clarifying alcoholic beverages comprising:
   admixing substantially pure particulate crosslinked insoluble native collagen with an alcoholic beverage subsequent to fermentation, said collagen being present at a level of at least 0.001 parts by weight to 100 parts by volume of alcoholic beverage;
   aging the admixture for a sufficient time to allow the collagen to complex haze causing material in the beverage; and
   separating the collagen complexed with the haze causing material to produce a clear alcoholic beverage.

2. The method of claim 1 wherein the particulate native collagen has a particle size of less than 1 millimeter.

3. The method of claim 2 wherein the particulate native collagen has a particle size of less than 0.5 millimeters.

4. The method of claim 1 wherein the particulate native collagen is admixed at a level of at least about 0.005 parts by weight to 100 parts by volume of alcoholic beverage.

5. The method of claim 4 wherein the particulate native collagen is admixed at a level of up to about 0.01 parts by weight to 100 parts by volume of alcoholic beverage.

6. The method of claim 1 wherein the native collagen is admixed with the alcoholic beverage as an aqueous suspension.

7. The method of claim 6 wherein said aqueous suspension is up to 5% by weight collagen.

8. The method of claim 7 wherein said aqueous suspension is up to 1% by weight collagen.

9. The method of claim 1 wherein said alcoholic beverage is beer.

10. The method of claim 1 wherein said alcoholic beverage is wine.

11. The method of claim 1 wherein said separation of the collagen complexed with the haze causing material is by filtration.

* * * * *